(No Model.)

W. B. DEAN & A. PELTIER.
Manufacture of Glass Articles.

No. 237,371. Patented Feb. 8, 1881.

Witnesses:
Chas. F. Hathaway
Wm. J. Darnstaedt

Inventor:
Wm. B. Dean
Alphonse Peltier

UNITED STATES PATENT OFFICE.

WILLIAM B. DEAN, OF NEW YORK, AND ALPHONSE PELTIER, OF BROOKLYN, N. Y.

MANUFACTURE OF GLASS ARTICLES.

SPECIFICATION forming part of Letters Patent No. 237,371, dated February 8, 1881.

Application filed July 27, 1880. (No model.)

*To all whom it may concern:*

Be it known that we, WM. B. DEAN, of New York city, county and State of New York, and ALPHONSE PELTIER, of the city of Brooklyn, county of Kings, and State of New York, have invented a new and useful Improvement in the Manufacture of Glass Articles, of which the following is a specification.

The invention relates to the manufacturing of glassware in a form to add luster and beauty.

The object of our invention is to form cavities or hollow spaces within the surfaces of a glass article for the purpose of ornamentation.

The invention consists, first, in forming a mold in which to partly prepare the gather, or lump of glass on the end of the blow-pipe; second, of a second preparation of the gather by means of dipping in melted glass, by which combined processes the gather is fully prepared for blowing, in the usual manner, either in molds or free into an article of any desired shape.

A person skilled in the art of manufacturing glass will be enabled by the following description of our invention to make the required molds, which constitutes the first preparation, and to properly dip, which constitutes the second preparation of the gather without having recourse to drawings; but to make the invention clear beyond doubt, reference is had to the accompanying drawings, in which similar letters of reference indicate like parts.

Figure 1:
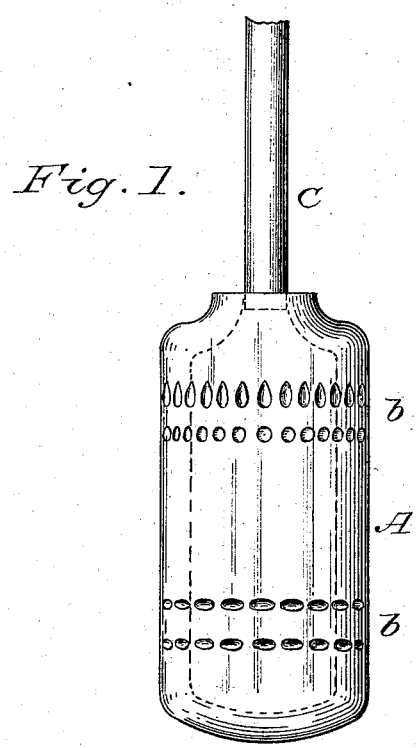
Figure 2:
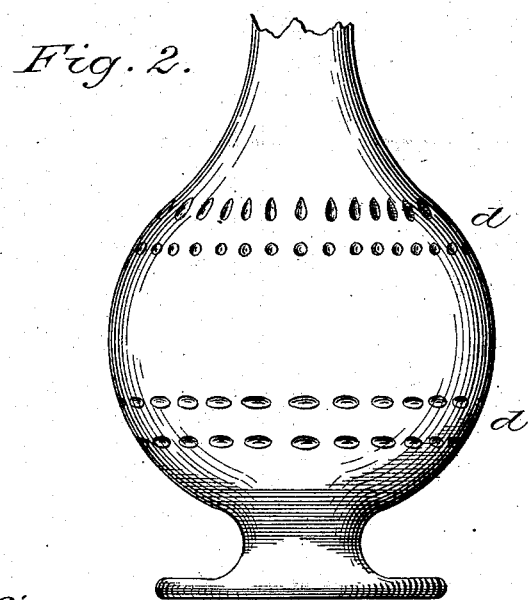

Figure 1 represents a prepared gather as coming from the mold. Fig. 2 represents a manufactured article blown from the gather, as represented in Fig. 1, after passing through the second preparation.

We consider it unnecessary to illustrate the mold in which the gather is first prepared, as it is evident that it is but a common mold having an inside shape like the surface of the prepared gather, as indicated by Fig. 1, in which *b b* represent indentures, which are formed by corresponding projections in the mold.

In preparing the gather, which involves two operations, which are mentioned above—viz., forming in a mold and dipping in melted glass—consists our invention. The first preparation is effected by making an iron mold with projections on its surface of such shape and form as is required to impress into the gather. These projections are made more or less prominent, in proportion as the figures are required to be large or small; also, the size of the mold must be in proportion to the desired size of the article to be manufactured, it being evident that the ornamentation on the manufactured article depends upon the projecting figures on the surface of the mold; so it is evident that any desired ornamentation upon the manufactured article may be effected by making on projection the desired form within the mold. The above will suffice to show the form of mold required. The next step is to gather a sufficient amount of glass on the blow-pipe and blow the same within the preparing mold. The result will be (presuming the projections to be oval) a prepared gather with oval indentures, as indicated at *b b*, Fig. 1, and plain surf A. This describes the first preparation. Now, having the gather, with the desired indentures, as effected by means of the mold, we proceed to cover these indentures, thereby forming a cavity or hollow space within the surfaces of the gather. This covering is preferably effected by quickly dipping the gather into a pot of melted glass, which will adhere to the plain surface and draw over the indentures, which process serves for ordinary work; but it may be effected with finer results by first blowing a small quantity of glass into another mold a little larger than the first and having a plain surface, and while yet in a plastic state blow the gather into this second mold, thus uniting the plain surfaces of the gather and the glass first blown in, and covering the indentures, thus forming cavities or hollow spaces within the surface, and constituting the second and complete preparation of the gather preparatory to manufacturing the required article. The gather may then be blown, in the usual manner, into any required shape—as, for example, see Fig. 2, which represents an article blown from the gather, Fig. 1, the cavities *d d* corresponding to *b b*, Fig. 1.

What we claim as our invention is—

1. As an improvement in the manufacture of decorated glassware, the process herein described of blowing the glass in a mold provided with projecting points, bands, or other ornamental design, so as to form depressions in the article so blown, then dipping the article thus partly formed into melted or molten glass, so as to seal or pocket the air in the cavities, and then finishing the article in any desired manner.

2. As a new manufacture, an article of glassware ornamented with air bubbles or cavities within its walls, as set forth.

WM. B. DEAN.
ALPHONSE PELTIER.

Witnesses:
CHAS. F. HATHAWAY,
WM. J. DARNSTAEDT.